(12) United States Patent
Lim et al.

(10) Patent No.: US 8,345,612 B2
(45) Date of Patent: Jan. 1, 2013

(54) SYSTEM AND METHOD FOR COMMUNICATING USING INTERNET PROTOCOL

(75) Inventors: Han-Na Lim, Siheung-si (KR); Yegin Alper, Istanbul (TR); Sung-Ho Choi, Suwon-si (KR); Ji-Cheol Lee, Yongin-si (KR); Tae-Sun Yeoum, Seoul (KR)

(73) Assignee: Samsung Electronics Co., Ltd (KR)

( * ) Notice: Subject to any disclaimer, the term of this patent is extended or adjusted under 35 U.S.C. 154(b) by 354 days.

(21) Appl. No.: 12/678,029

(22) PCT Filed: Sep. 12, 2008

(86) PCT No.: PCT/KR2008/005410
§ 371 (c)(1),
(2), (4) Date: Mar. 12, 2010

(87) PCT Pub. No.: WO2009/035294
PCT Pub. Date: Mar. 19, 2009

(65) Prior Publication Data
US 2010/0226350 A1 Sep. 9, 2010

(30) Foreign Application Priority Data
Sep. 13, 2007 (KR) .......................... 10-2007-0093320

(51) Int. Cl.
*H04W 4/00* (2009.01)

(52) U.S. Cl. ..................................... 370/329; 455/452.1
(58) Field of Classification Search ....................... None
See application file for complete search history.

(56) References Cited

U.S. PATENT DOCUMENTS

| 6,230,012 | B1 | 5/2001 | Willkie et al. | |
|---|---|---|---|---|
| 2006/0245408 | A1 | 11/2006 | Lee et al. | |
| 2008/0151927 | A1* | 6/2008 | Peisalo et al. | 370/458 |
| 2008/0192674 | A1* | 8/2008 | Wang et al. | 370/315 |
| 2008/0242292 | A1* | 10/2008 | Koskela et al. | 455/423 |
| 2009/0305707 | A1* | 12/2009 | Pudney | 455/445 |

FOREIGN PATENT DOCUMENTS

KR 1020060114482 A 11/2006

OTHER PUBLICATIONS

PCT/ISA/237 Written Opinion and Search Report issued in PCT/KR2008/005410 (10pp).

* cited by examiner

*Primary Examiner* — Jianye Wu
(74) *Attorney, Agent, or Firm* — The Farrell Law Firm, P.C.

(57) ABSTRACT

Disclosed is a system and a method for communication using different IPs, i.e. a mobile IP supporting mobility and a simple IP, according to the service by a UE. The method includes network initiated IP allocation (i.e. the network allocates different IPs to the UE) and UE initiated IP allocation (i.e. the UE directly requests an IP corresponding to a specific service). As such, the IP is selected and used based on consideration of continuity of the service to be supported by the UE.

14 Claims, 6 Drawing Sheets

SYSTEM AND METHOD FOR COMMUNICATING USING INTERNET PROTOCOL

BACKGROUND OF THE INVENTION

1. Field of the Invention

The present invention relates to a system and a method for communication using an IP (Internet Protocol), and more particularly to a system and a method for communicating by using different IPs according to a specific service by a UE.

2. Description of the Related Art

As generally known in the art, an IP refers to an Internet layer protocol devised to provide wired communication devices with various types of packet services. Development of IP communication technology is followed by discussion of schemes for allocating an IP to a UE to support a packet service in a mobile communication system.

An IP allocated to a UE is maintained the same in a subnet managed by a gateway that has allocated the IP. However, if the UE moves or if the gateway is changed by a specific communication situation, a new IP is generally allocated to the UE by a new gateway. Then, the service that has been provided through the previous IP is interrupted or terminated.

In other words, use of a fixed IP has a problem in that the continuity of the service provided to the UE is not generally guaranteed if the UE moves or if the communication situation of the UE varies.

This will be explained with reference to an example. It is assumed that a UE supports a VoIP (Voice of Internet Protocol) service by using an IP. The UE supports voice communication with another UE by using an allocated IP. If the user moves (e.g. by mass transportation, by car, or on foot), the gateway of the IP allocated to the UE may move out of the area under management. In this case, the UE is assigned a new IP from a new gateway. This means, in this situation, the UE cannot support the VoIP service any more by using the previously allocated IP.

As a result, the voice communication between both UEs is interrupted, and the UE must dial again, i.e., the voice communication-related call setup signaling must resume from the beginning.

In an attempt to solve the above-mentioned problem, a mobile IP has been proposed. According to this scheme, a UE is assigned two IPs, i.e. a fixed IP that remains unchanged regardless of mobility of the UE, and a mobile IP that varies as the UE moves. The fixed IP is referred to as a HA (Home Address), which is made known to the outside when the UE is to use a service. The mobile IP is referred to as a CoA (Care of Address).

When the mobile IP is applied to a UE supporting the VoIP service, the UE has a HA and a CoA. If the UE moves, the CoA is varied, but the HoA is retained, so that the voice communication service is maintained continuously.

As explained above, a specific service in a communication system must have its continuity guaranteed, considering the service characteristics. This is crucial for satisfying the demand of service users. The specific service includes, for example, a VoIP service, a FTP (File Transfer Protocol) service, a streaming service, etc.

The service continuity is becoming a major issue in the next-generation mobile communication system, and the mobile IP needs to be adopted in connection with support for the service continuity. This necessitates discussion of a detailed method regarding how and which IP is to be used for communication in connection with service continuity in the next-generation mobile communication system.

DISCLOSURE

Technical Solution

Therefore, the present invention has been made in view of the above-mentioned problems, and the present invention provides a system and a method for communication using different IPs according to a specific service.

The present invention also provides a system and a method for IP communication guaranteeing service quality.

The present invention also provides a system and a method for IP allocation communication supporting service continuity and UE mobility.

The present invention also provides a system and a method for IP allocation communication supporting service continuity and minimizing the network load.

Technical Solution

In accordance with an aspect of the present invention, there is provided a communication method using an IP, the method including the steps of requesting a SGW to allocate an IP for a UE by a MME; checking an identity of the UE by the SGW, allocating a simple IP, and transmitting the simple IP and a mobile IP allocated by a PGW to the MME; and transmitting the mobile IP and the simple IP to the UE by the MME.

According to another aspect of the present invention, there is provided a communication system using an IP, the system including a network including a MME for receiving an IP allocation request from a UE and delivering the IP allocation request to a SGW, the SGW for checking an identity of the UE, allocating a simple IP, and transmitting the simple IP and a mobile IP allocated by a PGW to the MME, and the PGW for allocating the mobile IP; and the UE for receiving the allocated mobile IP and simple IP from the MME.

Advantageous Effects

The present invention is advantageous in that, when an IP is allocated to a UE, the continuity of a specific service requested by the UE is considered to prevent any unnecessary load in the network. Furthermore, the routing of the network system that allocates the corresponding IP becomes simple. In other words, different IPs are used according to the service of the UE to prevent the load of signaling between networks.

DESCRIPTION OF DRAWINGS

The foregoing and other objects, features and advantages of the present invention will become more apparent from the following detailed description when taken in conjunction with the accompanying drawings in which.

MODE FOR INVENTION

Figure 1:
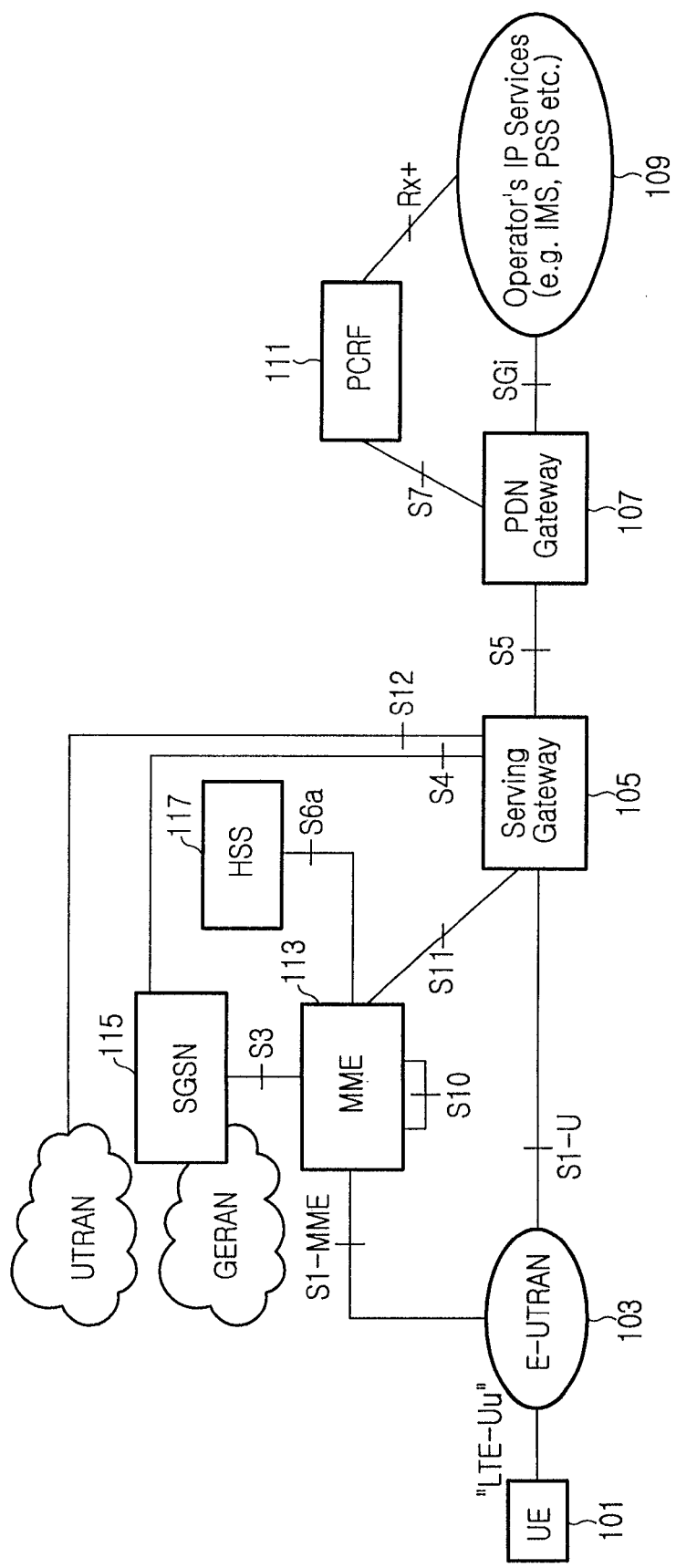
FIG. 1 shows SAE (Service Architecture Evolution), which is a packet system that has evolved based on 3GPP.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention proposes that a UE use different IPs, i.e. a mobile IP supporting mobility of the UP and a simple IP supporting no mobility, according to a specific condition, i.e. a service supported by the UE. In this connection, firstly, the present invention allocates an IP based on determination whether the service to be used by the UE requires service continuity or not. Secondly, an IP is allocated based on determination whether service continuity needs to be considered with regard to the area in which the UE is positioned.

According to an embodiment of the present invention, there is provided a scheme for allocating different IPs to a UE by a network (hereinafter, referred to as network initiated IP allocation), or a scheme for directly requesting a specific IP by the UE (hereinafter, referred to as UE initiated IP allocation). The network initiated IP allocation includes allocation of either a PMIP or a simple IP to a UE by the network without a direct request of the UE. The present invention characteristically includes a network node adapted to allocate a simple IP and a network node adapted to allocate a PMIP. For convenience of description, the network node adapted to allocate a simple IP will hereinafter be referred to as Node 1, and the network node adapted to allocate a PMIP will be referred to as Node 2. In other words, the Node 1 allocates a simple IP to the UE, and provides a shortest path for packet routing so that any unnecessary traffic load is prevented.

FIG. 1 shows SAE (Service Architecture Evolution) which has evolved based on 3GPP.

Referring to FIG. 1, the SAE refers to a communication system that has evolved based on the UMTS (Universal Mobile Terrestrial System) mobile communication system. The SAE includes an E-UTRAN (Enhanced UTRAN) 103, a MME (Mobility Management Entity) 113, a SGW (Serving Gateway) 105, and a PGW (Packet or Publication Data Network (PDN) Gateway).

The E-UTRAN 103 is an enhanced access network, and includes an eNB (enhanced Node B).

The MME 113 incorporates functions regarding NAS (Non-Access Signaling), NAS signaling security, UE mobility management, idle mode UE positioning, roaming, authentication, bearer management, etc.

The SGW 105 manages mobility between eNBs, mobility between 3GPP networks, idle mode downlink packet buffering, LI (Lawful Interception), packet routing and forwarding, etc. As used herein, LI refers to a legal type of interception of IP calls.

The PGW 107 incorporates functions regarding policy enforcement, per-user based packet filtering, charging support, LI, UE IP allocation, packet screening, etc.

A PCRF (Policy Control and Charging Rules Function) 111 manages a service-based policy to be applied to the UE, QoS (Quality of Service), etc.

A SGSN (Serving GPRS Support Node) 115 refers to an entity associated with a legacy packet network, and is adapted to control services related to UEs. For example, the SGSN 115 manages data related to charging of each UE, or selectively transmits data regarding a specific service to a UE.

A HSS (Home Subscriber Server) 115 manages the user's subscriber information and position information.

The above-mentioned entities may incorporate further functions according to the supported service.

Meanwhile, the SAE may adopt a PMIP (Proxy Mobile IP) as a means of supporting service continuity. The PMIP is characterized in that, although the conventional mobile IP requires elevation of the stack supporting the mobile IP of the UE, the network supports this in the case of the PMIP. In other words, the PGW 107 of the SAE allocates the PMIP to the UE even if the UE does not know the mobile IP. This means that the PGW 107 plays the role of the HoA.

However, in this case, every call of the UE must be anchored at the PGW 107 for the sake of mobility. This results in unnecessary PMIP signaling. Furthermore, the fact that every call must pass through the PGW 107 incorporating the HoA function increases the load on the network side. Therefore, in order to guarantee mobility of every call, the network is heavily loaded, which may degrade the QoS provided to the user.

It will be assumed that the IP is very unlikely to change in the geographical area where the service is used by the user (i.e. position of the UE). For example, a single PWG allocates an IP within a radius of 100 Km in the area in which the user is positioned, and there is no adjacent PGW or gateway so that, except for the IP being used, any other IP is very unlikely to be allocated. If the PMIP is allocated to guarantee mobility of the UE even in this case, the above-mentioned problems (i.e. unnecessary PMIP signaling and network load) may persist.

Figure 2:
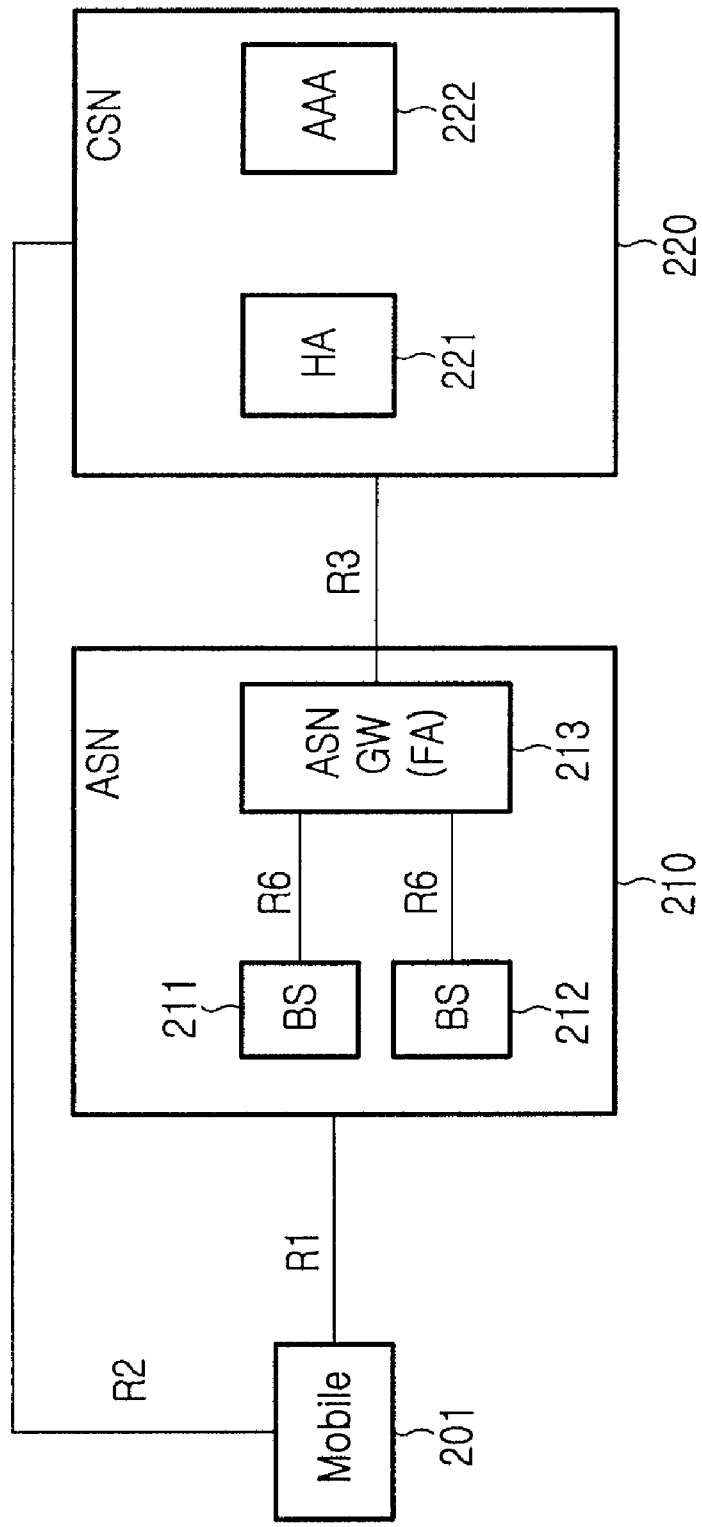
FIG. 2 shows a system based on WiMAX.

FIG. 2 shows a system architecture based on WiMAX (Worldwide Interoperability for Microwave Access).

Referring to FIG. 2, the WiMAX system includes an ASN (Access Service Network) and a CSN (Core Services Network).

The ASN 210 includes BSs (Base Stations) 211 and 212 and an ASN GW (ASN Gateway) 213. The BSs 211 and 212 are adapted to manage the mobility of UEs, the data path, the authentication relay, the paging agent, the key receiver, the context, the RRA (Radio Resource Agent), etc.

The ASN GW 213 incorporates functions regarding UE mobility management, data path management, the authenticator, the key distributor, the RRC (Radio Resource Control), the spreading factor authorization, the DHCP (Dynamic Host Configuration Protocol) proxy/relay, the MIP foreign agent, the location register, the PMIP client, the AAA (Authentication, Authorization, Accounting) client, the paging controller, etc.

The functionality of the BSs 211 and 212 and the ASN GW 213 may be varied depending on the WiMAX ASN profile or roaming architecture, for example.

The CSN 220 includes a HA (Home Agent) 221 and an AAA 222. The HA is an entity of the MIP described above, and the AAA 222 conducts UE authentication, etc.

It has also been proposed to use the PMIP as a means of supporting service continuity in the WiMAX system. This means that the WiMAX system has the same above-mentioned problem resulting from PMIP allocation.

Therefore, the present invention seeks to propose a PMIP allocation scheme that can reduce any unnecessary signaling load required to guarantee mobility of a UE in the network, as mentioned above, while guaranteeing the mobility of the UE to the greatest extent.

FIGS. 3*a*, 3*b*, 3*c*, and 3*d* show systems for allocating different IPs by a network according to the present invention.

Figure 3A:
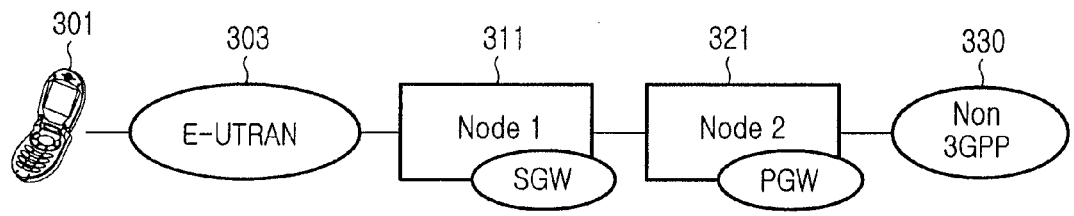
FIGS. 3a to 3d show the construction of systems to which an IP allocation method according to the present invention is applied.
Figure 3B:
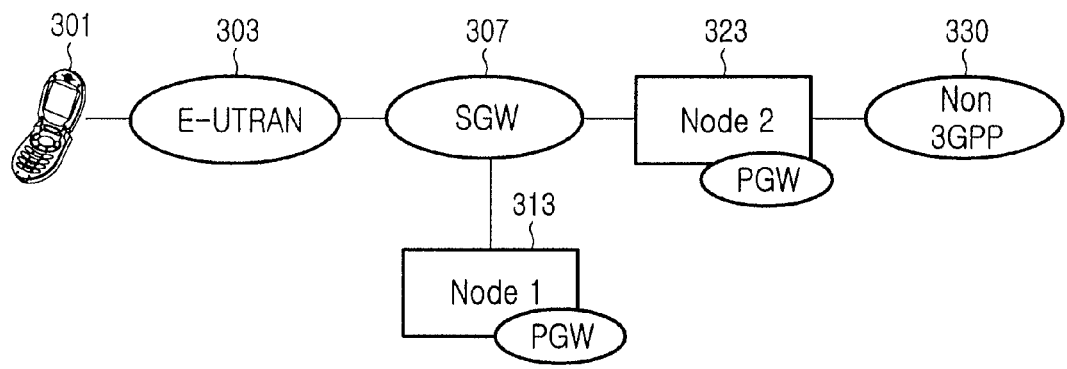
Figure 3C:
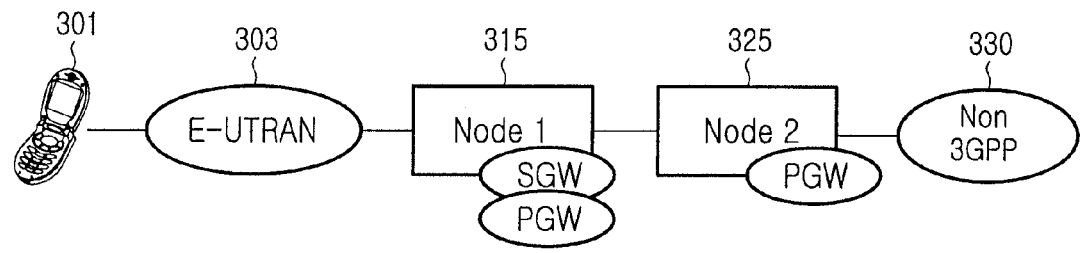
Figure 3D:
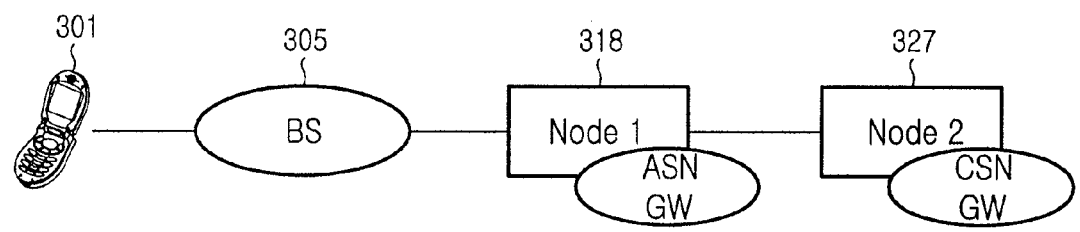

SAE is applied to the systems shown in FIGS. 3a to 3c, and WiMAX is applied to the system shown in FIG. 3d.

Particularly, FIG. 3a shows the SAE when Nodes 1 and 2 311 and 321 are a SGW and a PGW, respectively. The UE 301 is connected to the E-UTRAN 303 via a radio link, and the E-UTRAN 303 is connected to the Node 1 311. The Node 1 311, i.e. SGW, allocates a simple IP to the UE 301, and the Node 2 321, i.e. PGW, allocates a PMIP to the UE 301. The Node 1 311, i.e. SGW, has an additional IP allocation function.

FIG. 3b shows the SAE when both Nodes 1 and 2 313 and 323 are PGWs. The UE 301 is connected to the E-UTRAN 303 via a radio link, and the E-UTRAN 303 is connected to the SGW 307. The SGW 307 is connected to the Nodes 1 and 2 313 and 323. The PGW 313, which plays the role of the Node 1 313, allocates a simple IP, and the Node 2 323, i.e. PGW 324, allocates a PMIP.

FIG. 3c shows the SAE when Nodes 1 and 2 315 and 325 are a SGW/PGW and a PGW, respectively. The UE 301 is connected to the E-UTRAN 303 via a radio link, and the E-UTRAN 303 is connected to the Node 1 315, which is connected to the Node 2 325. The Node 1 315 plays the role of the SGW and/or the PWG, and allocates a simple IP as mentioned above. In other words, a single entity implements both the SGW and the PGW in FIG. 3. The Node 2 325 is adapted to allocate a PMIP.

FIG. 3d shows a case in which Nodes 1 and 2 318 and 327 are an ASG GW and a CSN GW, respectively. The UE 301 is connected to the BS 305 via a radio link, and the BS 305 is connected to the Node 1 318. The Node 1 318, i.e. ASN GW, is adapted to allocate a simple IP, and the Node 2 327, i.e. CSN GW, is adapted to allocate a PMIP.

As described with reference to FIGS. 3a to 3d, the present invention uses different IPs, i.e. a simple IP and a PMIP, according to the service of the UE, and different network nodes are set and operated to allocate the different IPs. In other words, different IPs are used for communication so that the UE communicates with different network nodes according to a specific service. Consequently, the end of signaling for IP communication varies according to the service supported by the UE, and any unnecessary network load is prevented in advance.

Figure 4A:
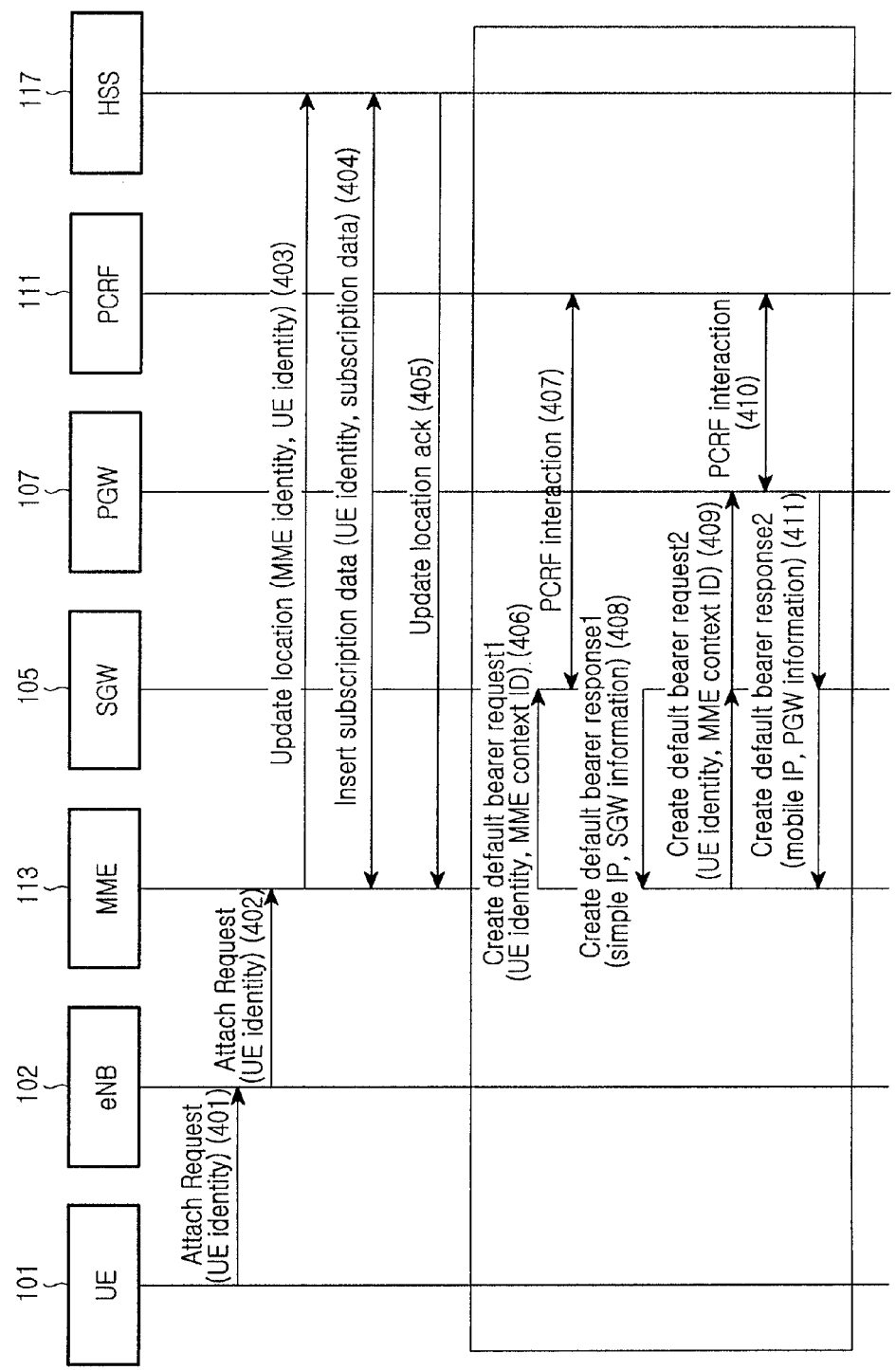
FIG. 4a is a signaling flowchart showing how a network allocates different IPs according to an embodiment of the present invention.
Figure 4B:
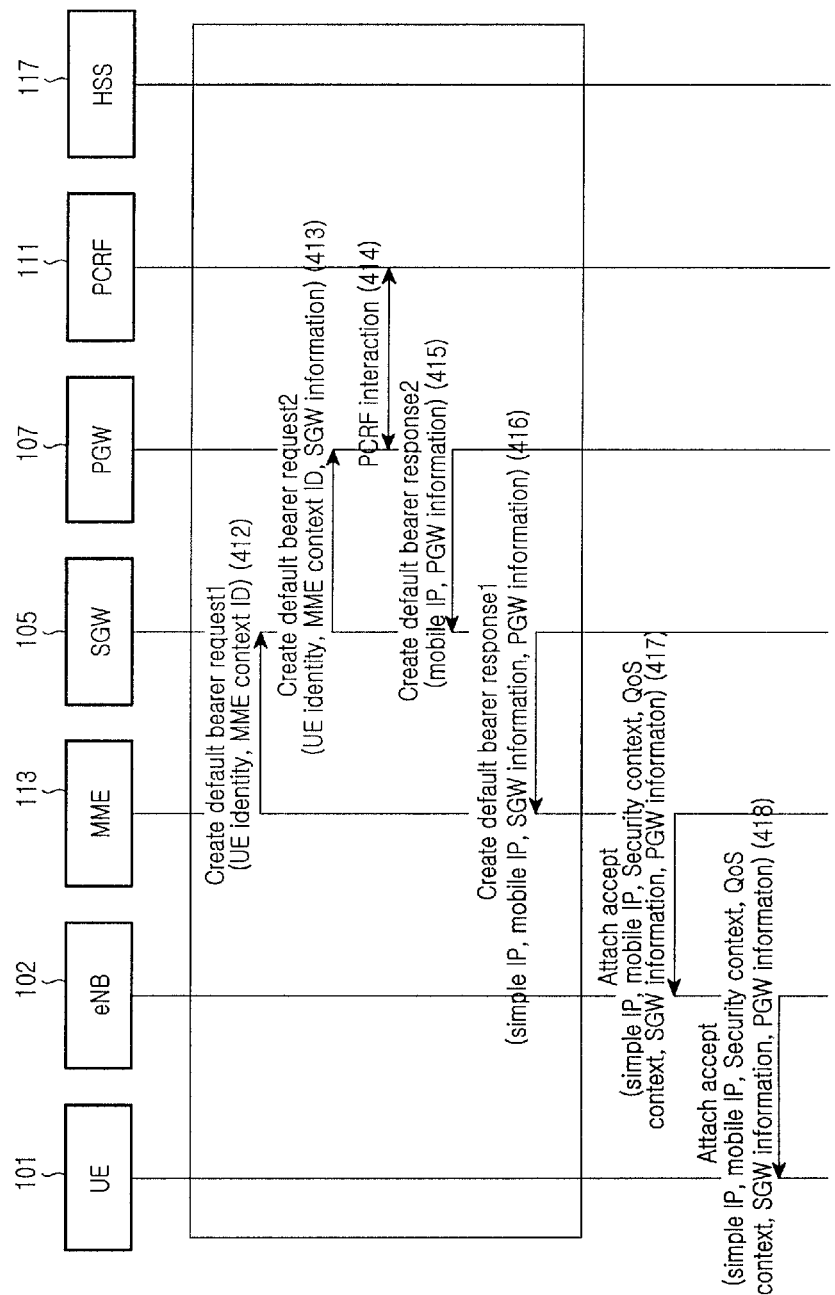
FIG. 4b is a signaling flowchart showing how a UE is assigned different IPs according to another embodiment of the present invention.

FIGS. 4a and 4b show a signaling flowchart when the UE is assigned a simple IP or a PMIP, with reference to the case shown in FIG. 3a for convenience of description.

Respective nodes in FIGS. 4a and 4b are given the same reference numerals as in FIG. 1. Respective messages in FIGS. 4a and 4b may include additional parameters besides the described ones. Furthermore, FIGS. 4a and 4b show a single drawing with parts characteristics of the present invention highlighted. Particularly, FIG. 4a shows a scheme regarding how a network allocates different IPs according to the present invention, and FIG. 4b shows a scheme regarding how a UE is assigned different IPs according to the present invention. It is to be noted that, except for parts enclosed by boxes, the following description applies to both schemes.

FIG. 4a shows signaling when a network allocates different IPs according to the present invention.

Referring to FIG. 4a, the UE 101 transmits an Attach request message, including a UE identity, to the eNB 102 in step 401. The UE 101 includes any type of communication device having mobility to conduct IP communication. The UE 101 can use both a fixed IP and an IP that guarantees mobility. In other words, the UE 101 can request an IP based on consideration of a service supported by the UE 101 in step 401. When the Attach request message is the initially transmitted message, the UE identity can be set as an IMSI (International Mobile Subscriber Identity) and transmitted. When there is an existing Attachment request message, i.e. when the above-mentioned Attachment request message is not the initially transmitted one, the UE identify can be set as a S-TMSI (S-Temporary Mobile Subscriber Identify) and transmitted.

In step 402, the eNB 102 forwards the Attach request message from the UE 101 to the MME 113.

In step 403, the MME 113 delivers an Update location message, including a MME identify and the UE identify, to the HSS 117. This is for the purpose of registering the location of the UE 101 on the HSS 117 by the MME 113 and retrieving subscriber information regarding the UE 101 from the HSS 117.

In step 404, the HSS 117 and the SGW 105 exchange an Insert subscription data message including the UE identify and subscription data.

In step 405, the HSS 117 transmits an Update location ack message to the MME 113 to inform that location information regarding the UE 101 is normally registered, in response to the Update location message delivered in step 403.

The MME 113, which manages mobility of the UE 101 in steps 403-405, can use the UE to confirm whether the UE 101 uses a simple IP or a PMIP. Alternatively, the UE 101 may have a USIM (Universal Subscriber Identify Module) card, for example, containing information regarding whether the UE 101 uses a simple IP or a PMIP. Based on this, the MME 113 can infer the characteristics of the IP service supported by the UE 101.

After receiving the Update location ack message from the HSS 117, the MME 113 transmits a Create bearer request message to a network node specific to and corresponding to the IP to be used by the UE 101.

More particularly, in step 406, the MME 113 is aware of whether the UE 101 is using a simple IP or a PMIP according to the service to be supported by the UE 101. Therefore, when it is confirmed that the UE 101 supports a simple IP, Create default bearer request 1 including the UE identify and MME context ID is transmitted to the SGW 105. In step 407, the SGW 105 conducts PCRF interaction with the PCRF 111 to obtain a PCC (Policy & Charging Control) rule regarding the UE 101. After the PCRF interaction, the SGW 105 delivers a Create default bearer response 1 message, including the simple IP and SGW-related information, to the MME 113 in step 408. The SGW-related information includes an IP address, a TEID (Tunnel Endpoint Identifier) of the control/user plane, etc.

When it is confirmed that the UE 101 supports a PMIP, the MME 113 transmits Create default bearer request 2, including the UE identity and MME context ID, to the PGW 107 in step 409.

According to an embodiment of the present invention, the PGW 107, which acts as a HA with regard to the UE 101, conducts interaction with the PCRF 111 to obtain a PCC rule regarding the UE 101 in step 410.

In step 411, the PGW 107 delivers a Create default bearer response 2 message, including a mobile IP allocated via the SGW 105 and the PGW-related information, to the MME 113. The PGW-related information includes the IP address of the PGW 107, the TEID of the control/user plane, etc.

The MME 113 is aware of both the simple IP and PMIP allocated to the UE 101, and can selectively deliver the allocated simple IP and PMIP to the UE 101. Particularly, considering the characteristics of the service supported by the UE 101, the MME 113 transmits either an Attach accept message including only the simple IP or an Attach accept message including the PMIP.

As mentioned above, after receiving the Attach request message from the UE, the MME 113 receives a simple IP and a MPIP allocated by the SGW 105 and PGW 107, which act as Nodes 1 and 2 according to the present invention, respectively, according to service characteristics, inserts the IP of the corresponding service into an Attach accept message, and sends the message. Meanwhile, the MME 113 must manage two allocated IPs, and the Attach accept message may include two IPs. Particularly, referring to FIG. 4a, the MME 113 sends two Create default bearer request messages to the SGW 105 and the PGW 107, respectively, and receives two IPs. It is to be noted that steps 406-408 and steps 409-411 may proceed simultaneously. Alternatively, steps 406-408 may follow step 411.

FIG. 4b shows signaling when the UE is assigned different IPs according to the present invention.

Referring to FIG. 4b, after receiving the Attach request message from the UE, the MME 113 transmits Create default bearer request 1 including a UE identity and a MME context ID to the SGW 105 in step 412.

In step 413, the SGW 105 checks the UE identity from the Create default bearer request 1 to allocate a simple IP, and transmits Create default bearer request 2 to the PGW 107 to allocate a mobile IP to the UE 101. The Create default bearer request 2 message includes the UE identity, the MME context ID, and SGW information. The SGW information includes information necessary for routing between the SGW 105 and the PGW 107.

In step 414, the PGW 107 conducts interaction with the PCRF 111 to obtain a PCC rule regarding the UE as desired.

In step 415, the PGW 107 allocates a PMIP for the UE 101 and delivers a Create default bearer response 2 message, including the PMIP and PGW-related information, to the SGW 105.

Then, in step 416, the SGW 105 delivers a Create default bearer response 1 message, including the simple IP allocated by itself, SGW information regarding itself, the PMIP allocated by the PGW 107 in step 415, and PGW information, to the MME 113. The MME 113 can acquire the PMIP and the simple IP.

The MME 113 then inserts the simple IP and the PMIP to an Attach accept message and transmits the message to the eNB 102 in step 417. Besides both IPs, the Attach accept message may further include security context, QoS context, SGW information, PGW information, etc.

Therefore, in step 418, the eNB 102 delivers the Attach accept message, including the above-mentioned information, to the UE 101. After receiving the Attach accept message including both simple IP and PMIP, the UE 101 selects and uses either the simple IP or the PMIP based on consideration of the characteristics of the service to be supported by the UE 101, i.e. continuity of the service.

As mentioned above, the MME 113 does not send a Create default bearer request to each of the SGW 105 and the PGW 107. Instead, the SGW 105 receives a Create default bearer request from the MME 113 and forwards it to the PGW 107 to request PMIP allocation. Furthermore, the UE 101 is assigned two IPs from the MME 113, and selectively conducts IP communication based on consideration of service continuity. The UE 101 delivers an Attach request message to the network, i.e. MME 113, to inform that it wants a specific IP, and the MME 113 allocates a specific IP to the UE 113.

As described with reference to FIGS. 4a and 4b, there are two methods of allocating the corresponding IP according to whether the MME 113 receives the PMIP from the PGW 107 or the SGW 105 receives the PMIP from the PGW 107 at a request of the MME 113.

An example of application to WiMAX according to another embodiment of the present invention will be described with regard to the method for allocating an IP to the UE. In WiMAX, the UE sends a DHCP request to the network, i.e. DHCP sever, and the DHCP sever allocates an IP, inserts it to a DHCP ack message, and transmits the message to the UE. The FA of the ASN registers MIP on the HA (in CSN) to use a PMIP as the IP during this process.

The UE inserts indication to the DHCP request message to indicate that it requests a simple IP or a PMIP, and transmits the message to the DHCP relay.

When the UE wants a simple IP, the DHCP relay does not conduct MIP registration with regard to the IP allocated by the DHCP server, but inserts the IP into a DHCP ack message and transmits the message to the UE. When the UE wants a PMIP, the DHCP relay registers the IP, which has been allocated to the FA from the DHCP server in the conventional manner, on the HA.

In other words, the DHCP relay according to the present invention is supposed to be able to interpret the indication from the UE, unlike the conventional WiMAX operation, and must trigger the FA accordingly to conduct MIP registration. The DHCP request message includes a DHCP Discover message, a DHCP request message, etc., and the DHCP ack message may include a DHCP offer message, a DHCP ack message, etc. The DHCP ack message may include the same indication included in the DHCP request message.

Methods for transmitting the indication, to which WiMAX is applied, according to the present invention will be described.

According to the first method, a new DHCP option indicating a specific IP request is created. The option is used for a DHCP request message to request a specific IP. An exemplary new option is given below.

Example 1

DHCP: DHCP Target Domain Name=value
wherein, the value includes a domain for a specific IP.

Therefore, the UE adds the value to the request message based on subscription information, etc. which has already been stored in the USIM, for example, or which has been obtained during the access authentication process. The DHCP relay and the UE are aware of whether domain is for a simple IP or for a PMIP.

The option field of a DHCP Discover message, to which the first method is applied, is shown in Table 1 below.

TABLE 1

DHCP: Option field (options)
    DHCP: DHCP Message Type = DHCP Discover
    DHCP: Client-identifier = (Type: 1) 08 00 2b 2e d8 5e
    DHCP: HostName = JUMBO-WS
    DHCP: Parameter Request Lins = (Length: 7) 01 0f 03 2c 2e 2f 06
        DHCP: Target Domain Name = hnsp1.com
    DHCP: End of this option field According to the second method, an indication field is added to the existing DHCP option. For example, a new type and a corresponding value are defined in the existing DHCP client-identifier option. This DHCP request message is used to request a specific IP. An example of the above-described method is given below.

Example 2 wherein, the Type is used to set a value that has not been used, and the value may include domain information described with reference to Table 1. An example of applying the second method is given in Table 2 below, which shows the option field of the DHCP Discover message. An option other than the client-client may be applied for the second scheme.

TABLE 2

DHCP: Option field    (options)
    DHCP: DHCP Message Type    = DHCP Discover
    DHCP: Client-identifier    = (Type: 0)
    00-11-22-33-44-55-0001.vnsp1.com
    DHCP: HostName    = JUMBO-WS
    DHCP: Parameter Request Lins = (Length: 7) 01 0f 03 2c 2e 2f 06
    DHCP: Target Domain Name    = hnsp1.com
    DHCP: End of this option field As mentioned above, the UE directly requests a specific IP, and the signaling transmitting/receiving end node varies according to IP allocation. This prevents any unnecessary signaling load.

What is claimed is:

1. A communication method using an Internet Protocol (IP), the method comprising the steps of:
   requesting a Serving Gateway (SGW) to allocate an IP address for a User Equipment (UE) by a Mobility Management Entity (MME);
   checking an identity of the UE by the SGW, allocating a simple IP address, and transmitting the simple IP address and a mobile IP address allocated by a Packet Data Network (PDN) Gateway (PGW) to the MME; and
   transmitting the mobile IP address and the simple IP address to the UE by the MME.

2. The method as claimed in claim 1, further comprising a step of transmitting/receiving the identity of the UE and information regarding the SGW between the MME and the SGW to create a default bearer for allocating the simple IP address.

3. The method as claimed in claim 2, further comprising a step of transmitting/receiving the identity of the UE and information regarding the PGW between the MME and the PGW to create a default bearer for allocating the mobile IP address.

4. The method as claimed in claim 1, further comprising a step of transmitting/receiving the identity of the UE, information regarding the SGW, and information regarding the PGW between the SGW and the PGW to create a default bearer for allocating the mobile IP address.

5. The method as claimed in claim 4, further comprising a step of transmitting/receiving the identity of the UE, information regarding the SGW, information regarding the PGW, and the allocated mobile IP address between the MME and the SGW to create a default bearer for allocating the simple IP address.

6. The method as claimed in claim 1, further comprising a step of transmitting/receiving the identity of the UE, the mobile IP address, and the simple IP address between the MME and the UE to make an Attach request and accept the Attach request.

7. The method as claimed in claim 6, further comprising a step of selecting an IP address between the mobile IP address and the simple IP address by the UE, making an Attach request according to the selected IP address, and accepting the Attach request.

8. A communication system using an Internet Protocol (IP), the system comprising:
   a network comprising a Mobility Management Entity (MME) for receiving an IP address allocation request from a User Equipment (UE) and delivering the IP address allocation request to a Serving Gateway (SGW), the SGW for checking an identity of the UE, allocating a simple IP address, and transmitting the simple IP address and a mobile IP address allocated by a Packet Data Network (PDN) Gateway (PGW) to the MME, and the PGW for allocating the mobile IP address; and
   the UE for receiving the allocated mobile IP address and simple IP address from the MME.

9. The system as claimed in claim 8, wherein the MME and the SGW are adapted to transmit/receive the identity of the UE and information regarding the SGW to create a default bearer for allocating the simple IP address.

10. The system as claimed in claim 9, wherein the MME and the PGW are adapted to transmit/receive the identity of the UE and information regarding the PGW to create a default bearer for allocating the mobile IP address.

11. The system as claimed in claim 8, wherein the SGW and the PGW are adapted to transmit/receive the identity of the UE, information regarding the SGW, and information regarding the PGW to create a default bearer for allocating the mobile IP address.

12. The system as claimed in claim 11, wherein the MME and the SGW are adapted to transmit/receive the identity of the UE, information regarding the SGW, information regarding the PGW, and the allocated mobile IP address to create a default bearer for allocating the simple IP address.

13. The system as claimed in claim 8, wherein the MME and the UE are adapted to transmit/receive the identity of the UE, the mobile IP address, and the simple IP address so as to make an Attach request and accept the Attach request.

14. The system as claimed in claim 13, wherein the UE is adapted to select an IP address between the mobile IP address and the simple IP address, make an Attach request according to the selected IP address, and accept the Attach request.

* * * * *